US011979480B2

(12) United States Patent
Sperling et al.

(10) Patent No.: US 11,979,480 B2
(45) Date of Patent: May 7, 2024

(54) QUADRATURE CIRCUIT INTERCONNECT ARCHITECTURE WITH CLOCK FORWARDING

(71) Applicant: INTERNATIONAL BUSINESS MACHINES CORPORATION, Armonk, NY (US)

(72) Inventors: Michael Sperling, Poughkeepsie, NY (US); Daniel Mark Dreps, Georgetown, TX (US); Erik English, Salt Point, NY (US); Jieming Qi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 17/933,557

(22) Filed: Sep. 20, 2022

(65) Prior Publication Data

US 2024/0097872 A1    Mar. 21, 2024

(51) Int. Cl.
| | | |
|---|---|---|
| *H04L 7/00* | (2006.01) | |
| *H04L 25/00* | (2006.01) | |
| *H04L 25/24* | (2006.01) | |
| *H04L 25/40* | (2006.01) | |

(52) U.S. Cl.
CPC .......... *H04L 7/0012* (2013.01); *H04L 25/247* (2013.01)

(58) Field of Classification Search
CPC ... H04L 7/0012; H04L 25/247; H03L 7/0814; G06K 7/10009; G06F 1/04
USPC ................. 375/371, 372, 375, 376, 326, 327
See application file for complete search history.

(56) References Cited

U.S. PATENT DOCUMENTS

| | | |
|---|---|---|
| 7,501,869 B2 | 3/2009 | Fan |
| 7,814,359 B2 | 10/2010 | Bae |
| 8,116,420 B2 | 2/2012 | Ali |
| 8,774,228 B2 | 7/2014 | Bulzacchelli |
| 9,325,542 B2 | 4/2016 | Agrawal |
| 10,141,940 B2 | 11/2018 | Jeong |
| 10,444,785 B2 | 10/2019 | Abramzon |
| 10,680,592 B2 | 6/2020 | Zhao |
| 10,848,297 B1 | 11/2020 | Ribeiro |

(Continued)

OTHER PUBLICATIONS

International Searching Authority, "International Search Report and Written Opinion of the International Searching Authority", International Application No. PCT/CN2023/107018, Mailed Sep. 18, 2023, 7 pages.

(Continued)

*Primary Examiner* — Phuong Phu
(74) *Attorney, Agent, or Firm* — Caleb D. Wilkes

(57) ABSTRACT

An integrated circuit communication architecture is provided and includes a clock lane, a clock divider, and a first de-skew circuit. The clock lane is configured to send a clock signal at a first rate from a first chip to a second chip. The clock divider is on the second chip and is configured to receive the clock signal sent via the clock lane and to create and send a first divided clock signal and a second divided clock signal from the received clock signal. The divided clock signals are sent at reduced rates compared to the first rate. The clock divider maintains current mode logic properties for the divided clock signals. The first de-skew circuit is configured to receive and process the divided clock signals to allow for sampling of data transmitted from the first chip to the second chip.

20 Claims, 5 Drawing Sheets

(56) References Cited

U.S. PATENT DOCUMENTS

| | | |
|---|---|---|
| 10,871,796 B1 | 12/2020 | Gaide |
| 10,901,485 B2 | 1/2021 | Ware |
| 10,931,289 B2 | 2/2021 | Satoh |
| 10,972,108 B1 | 4/2021 | Li |
| 11,057,039 B1 | 7/2021 | Kossel |
| 11,258,436 B1 | 2/2022 | Lin |
| 2004/0217787 A1 | 11/2004 | Wong |
| 2006/0230302 A1 | 10/2006 | Tsai |
| 2011/0096882 A1 | 4/2011 | Haas |
| 2012/0062369 A1* | 3/2012 | Ishizaki ............ G06K 7/10009 375/259 |
| 2014/0362962 A1 | 12/2014 | Meier |
| 2018/0123575 A1 | 5/2018 | Huang |
| 2020/0051610 A1* | 2/2020 | Zerbe ....................... G06F 1/04 |
| 2020/0228127 A1 | 7/2020 | Patukuri |
| 2023/0298645 A1* | 9/2023 | Choi ..................... H03L 7/0814 365/233.1 |

OTHER PUBLICATIONS

Sperling et al., "Quadrature Circuit Interconnect Architecture With Clock Forwarding", International Application No. PCT/CN2023/107018, International Filing Date Jul. 12, 2023, 30 pages, claims priority on U.S. Appl. No. 17/933,557 (present application).

Ardalan et al., "Bunch of Wires: An Open Die-to-Die Interface," 2020 IEEE Symposium on High-Performance Interconnects (HOTI), Aug. 2020 IEEE, pp. 9-16.

Choi et al., "A 0.45-to-0.7V 1-to-6Gb/s 0.29-to-.58pJ/B Source-Sychronous Transceiver Using Automatic Phase Calibration in 65nm CMOS," 2015 IEEE International Solid-State Circuits Conference, Feb. 2015, pp. 66-68, SSCC 2015 Session 3.

Dickson, et al., "A 1.4pJ/bit, Power-Scalable 16×12 GB/s Source-Synchronous I/O With DFE Receiver in 32 nm SOI CMOS Technology," IEEE Journal of Solid-State Circuits, vol. 50, No. 8, Aug. 2015, pp. 1917-1931.

Dickson, et al., "A 1.8-pJ/bit 16×16-GB/s Source Synchronous Parallel Interface in 32nm SOI CMOS with Receiver Redundancy for Link Recalibration," 2015 IEEE Custom Integrated Circuits Conference—CICC 2015, Sep. 2015, 4 pgs.

Jose et al., "A 1.5pJ/bit, 5-to-10Gbps Forwarded-Clock I/O with Per-Lane Clock De-Skew in a Low Power 28nm CMOS Process," published in 2019 IEEE Custom Integrated Circuits Conference (CICC), Apr. 2019, 4 pgs.

Jovanović et al., "Delay Locked Loop Clock Skew Compensator For Differential Interface Circuit," ICEST, Sozopol, Bulgaria, Jun. 28-30, 2018, pp. 115-118.

Kurd et al., "Next Generation Intel® Micro-architecture (Nehalem) Clocking Architecture," 2008 IEEE Symposium on VLSI Circuits Digest of Technical Papers, Jul. 2008, pp. 62-63.

Lee et al., "A 0.83-pJ/Bit 6.4-GB/s HBM Base Die Receiver Using a 45° Strobe Phase for Energy-Efficient Skew Compensation," IEEE Transactions On Circuits and Systems—II: Express Briefs, vol. 67, No. 10, Oct. 2020, pp. 1735-1739.

Shekhar et al., "Strong Injection Locking in Low-Q LC Oscillators: Modeling and Application in a Forwarded-Clock I/O Receiver," IEEE Transactions On Circuits And Systems—I: Regular Papers, vol. 56, No. 8, Aug. 2009, pp. 1818-1829.

Tian et al., "A Low Spur and Low Jitter Quadrature LO-Generator Using CML Inductive Peaking Technique For WLAN Transceiver," Electronics 2021, 10, 1869, MDPI, Aug. 3, 2021, 22 pgs.

Tian et al., "A quadrature Lo-generator using an external single-ended clock receiver for dual-band WLAN applications," IEICE Electronics Express, vol. 18, No. 10, 1-6, Apr. 9, 2021, 6 pgs.

\* cited by examiner

QUADRATURE CIRCUIT INTERCONNECT ARCHITECTURE WITH CLOCK FORWARDING

BACKGROUND

The present invention relates generally to processors that are used in computer systems such as personal computers, servers, and/or other computer devices with computer chips.

With a desire for faster, more powerful, and more energy-efficient computers, improved computer chip and computer chip package design have been attempted. Improved designs have been attempted to allow for expanded processor core count and improved memory bandwidth. Chip designs with smaller die have been made.

An embedded multi-die interconnect bridge (EMIB) has been created and is a complex multi-layered sliver of silicon which allows large quantities of data to be sent back and forth among adjoining chips at high speeds. High Bandwidth Memory (HBM) has been adopted as a standard in the industry and is a high-speed memory interface for 3D-stacked synchronous dynamic random-access memory. The EMIB and HBM designs can send many signals between chips but suffer from performance impacts, particularly if the two chips are not positioned immediately adjacent to each other. For slightly longer interconnects, e.g., with a length of high single digits to tens of millimeters, a standard connection such as a personal component interconnect express ("PCIe") or a double data rate (DDR) have been used. These standard connections are, however, power hungry for a short interface.

New interconnects typically use shorter pitches between chips formed with controlled collapse chip protection, so area constraints are much tighter and do not work with a standard serializer/de-serializer (SerDes).

Ali et al. U.S. Pat. No. 8,116,420 B2 provided clock-forwarding techniques for high-speed links. The clock-forwarding techniques included the use of a repeater circuit, such as a clock regeneration and multiplication circuit. In the repeater circuit, a clock multiplier unit (CMU) generates an internal clock signal based on a forwarded clock signal, which is received on a link.

Other interfaces such as Bunch of Wires (BoW) have tried to simplify the interconnect to keep the terminated SerDes aspect of the complex interfaces but remove much of the complexity. The BoW design suffers, however, from performance limitations because of the clocking requirements on the receive side.

Clock data recovery (CDR) circuits determine a clock signal by interpreting the transmitted data without any extra clock signal lane. The CDR circuit requires significant overhead, however, to reestablish a clock from the transmitted data. The overhead can consume substantial power.

The prior art has the disadvantages of lacking a combination of improved bandwidth, low latency, and reduced power requirements for chips and chip packages. The prior art can require high power-consuming structures such as clock data recovery (CDR) circuits in the receive macros, Phase Locked Loop (PLL) on the receive side, and/or redundancy of forward error correction (FEC).

SUMMARY

According to one example embodiment, an integrated circuit communication architecture is provided and includes a clock lane, a clock divider, and a first de-skew circuit. The clock lane is configured to send a clock signal at a first rate from a first chip to a second chip. The clock divider is on the second chip and is configured to receive the clock signal sent via the clock lane and to create and send a first divided clock signal and a second divided clock signal from the received clock signal. The first divided clock signal and the second divided clock signal are sent at reduced rates compared to the first rate. The clock divider maintains current mode logic properties for the first and second divided clock signals. The first de-skew circuit is configured to receive and process the first divided clock signal and the second divided clock signal to allow for sampling of data transmitted from the first chip to the second chip. A method corresponding to the integrated circuit communication architecture described above is also disclosed herein.

With this embodiment, data transmission between chips is achieved with high bandwidth, low latency, low power requirements compared to other SerDes structures, and while avoiding a forward error correction (FEC) structure.

According to another example embodiment, another integrated circuit communication architecture is provided that includes a clock lane, a clock divider, and first and second receivers on a second chip. The clock lane is configured to send a clock signal at a first rate from a first chip to a second chip. The clock divider is on the second chip and is configured to receive the clock signal sent via the clock lane and to create and send a first divided clock signal and a second divided clock signal from the received clock signal. The first divided clock signal and the second divided clock signal are sent at reduced rates compared to the first rate. The clock divider is configured to serve both the first receiver and the second receiver with each of the first divided clock signal and the second divided clock signal.

With this embodiment, data transmission between chips is achieved with reduced power requirements for handling a clock signal on the receive side. Multiple clock lanes for a single chip receiver may be avoided.

According to an additional embodiment, the first divided clock signal is an in-phase clock signal and runs at one quarter of a data rate. The second divided clock signal may be a quadrature clock signal and may run at one quarter of the data rate. The quadrature clock signal may be shifted by ninety degrees.

With this embodiment, high bandwidth and low latency data transmission are achieved via an interconnect between chips. Performance requirements on clock path circuits are lowered and the need for a per lane IQ generator is eliminated.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described example embodiments provide integrated circuit communication architectures which include an improved interconnect between computer chips on a package. With the improved interconnect, processor core count and memory bandwidth may be expanded for packages. The packages with the improved interconnect may achieve a high bandwidth with low latency, allow for lower power consumption, and avoid a fabricated evaluation chip structure. Thus, a computer system with the improved circuit communication architecture for a processor as described herein achieves enhanced performance for computing. The improved interconnect may be achieved by implementing clock signal forwarding and clock signal splitting that generates reduced frequency split clock signals. The clock signal forwarding may occur via a clock signal lane that is physically separate from one or more data lanes. The improved interconnect may also be achieved by removing a clock divider from within a chip receiver so as to be external to any specific receiver on the receiving chip so that the clock divider may split the clock signals to have reduced-frequency split signals that may serve multiple receivers on a chip of a package. With these features the improved interconnect also reduces space requirements by needing a single clock lane instead of multiple clock lanes between a transmitter-receiver pair of chips on a chip package.

Figure 1:
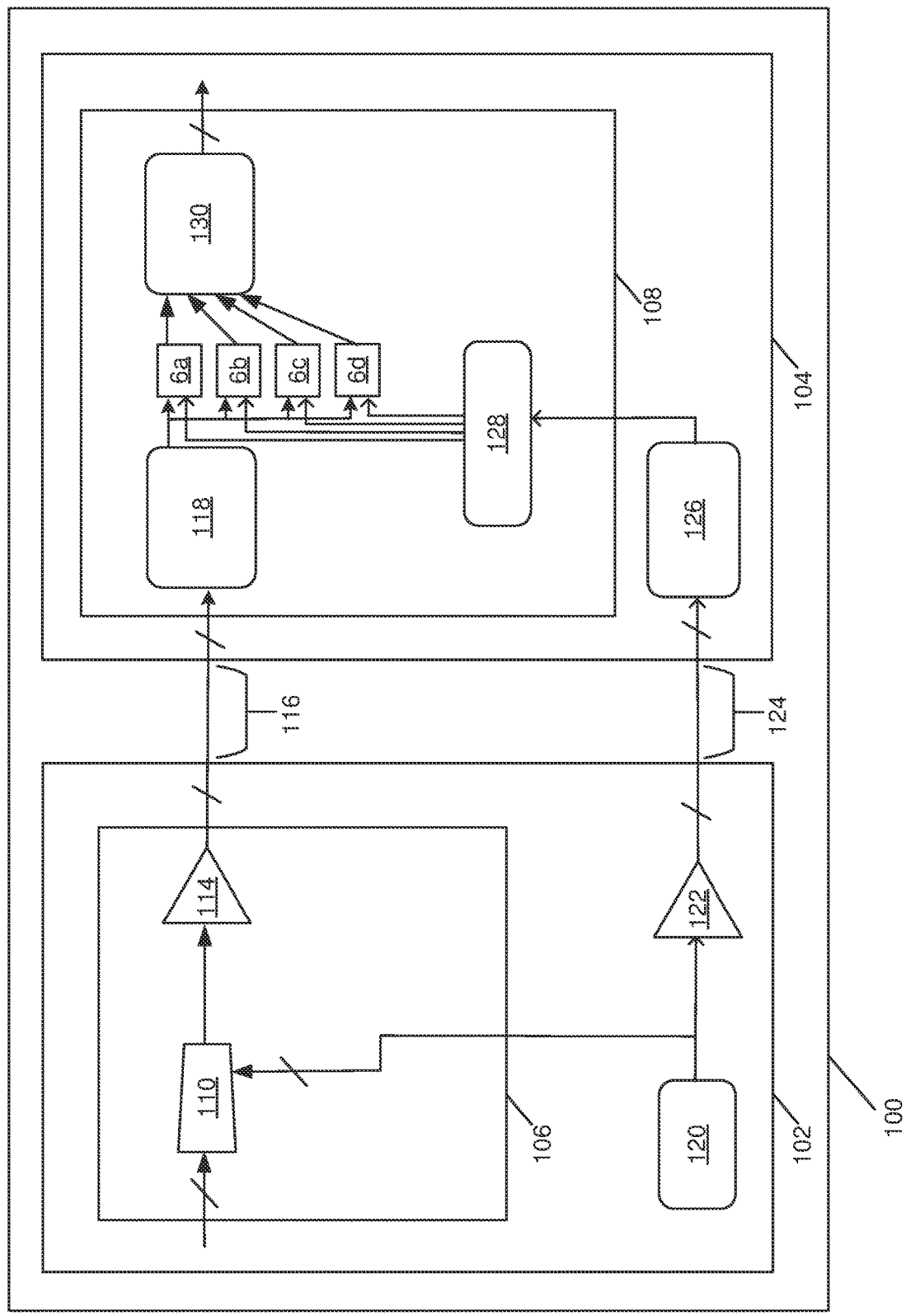
FIG. 1 is a block diagram illustrating a chip package with the clock signal split features in accordance with at least one embodiment.

FIG. 1 shows a block diagram illustrating a first chip package 100 with an improved interconnect in accordance with at least one embodiment. The first chip package 100 implements protective features to protect circuitry, wiring, and/or processing components held by the first chip package 100. The first chip package 100 may be formed of a support material that may include plastic and/or a ceramic material. The first chip package 100 has material strength and may be connected to a larger computer board such as a printed circuit board and/or a motherboard.

FIG. 1 shows a first chip 102 and a second chip 104 both connected to the first chip package 100. The first chip 102 and the second chip 104 may be directly connected to the first chip package 100. In the depicted embodiment, the first chip 102 and the second chip 104 have a controlled collapse chip connection to the first chip package 100. Other embodiments may include individual chips being connected to a chip package via other connection implementations. The chips are computer chips and may be formed from various materials including semiconductor material such as silicon.

Each of the chips may include various components such as cores, caches, and input/output (I/O). FIG. 1 illustrates a transmitter 106 of the first chip 102 and a receiver 108 of the second chip 104 to help illustrate aspects of an interconnect between the first chip 102 and the second chip 104. The transmitter 106 may transmit data to the receiver 108 via the interconnect. The receiver 108 may receive and process the transmitted data and send the received and processed data to other components on the second chip such as cores, caches, and input/output and/or to other chips or off-chip memory. In practice, the first chip 102 and the second chip 104 may each include multiple transmitters and multiple receivers for communicating with other chips, memories, and/or other chip components.

FIG. 1 shows that the interconnect between the first chip 102 and the second chip 104 may include multiple lanes including a data lane 116 and a clock signal lane 124. Data in the form of bits with a respective binary value may be transmitted via the data lane 116. A clock signal may be transmitted via the clock signal lane 124 and may be used to coordinate processing of the data that is received via the data lane 116.

FIG. 1 shows with the symbols "I" in the connections/lines that differential signaling is being implemented. For differential signaling, two complementary voltage signals may be generated and transmitted. Upon their receipt, the signals may be combined in order to produce one information signal. In other embodiments, the lanes with the enhanced interconnect may implement other signaling types instead of differential signaling. For example, in other embodiments single-ended signaling may be performed with each of the lanes of the interconnect.

FIG. 1 shows that the transmitter 106 may include a serializer block 110 and a data lane driver 114 for generating the data flow across the data lane 116. The receiver 108 may include an equalizer 118, one or more sampling latches, and a de-serializer 130 for receiving the data that is sent across the data lane 116. The equalizer 118 may perform termination and equalization of the received data. The depicted embodiment includes multiple sampling latches—namely a first sampling latch 6a, a second sampling latch 6b, a third sampling latch 6c, and a fourth sampling latch 6d. The sampling latches use the clock signals generated by the de-skew circuit 128 in order to accurately sample the data that is transmitted via the data lane 116. With the depicted four sampling latches, the data may be sampled at C4 clock intervals of 0, 90, 180, and 270 degrees via the first sampling latch 6a, the second sampling latch 6b, the third sampling latch 6c, and the fourth sampling latch 6d, respectively.

A clock generator 120 may generate a clock signal for transmission of the clock signal along the clock signal lane 124. The clock generator 120 may include current mode logic and may feed the generated clock signal to the clock lane driver 122 and to the serializer block 110. The clock signal in the depicted embodiment may be in the form of a square wave with a fixed, constant frequency oscillating between a one value and a zero value. The clock generator 120 may generate a full rate clock signal. A full rate clock signal is typically half of the rate of the data transmission that occurs in the data lane 116. The clock signal may be used for synchronization at a rising edge, a falling edge, and/or both a rising edge and a falling edge of the clock signal. The clock lane driver 122 may in some embodiments be the same structure as the data lane driver 114 but for driving the clock signal instead of the data.

The clock generator 120 may feed the generated clock signal to the serializer block 110 inside transmitter 106. The serializer block 110 serializes the data according to the clock signal. The serialized data will then be driven by the data lane driver 114. This data may be driven by both rising and falling edges of the clock, resulting in data that has a rate that is twice that of the clock signal, namely a double data rate.

The data lane 116 and the clock signal lane 124 may each be formed via a respective metal trace on the protective material of the chip package 100. The metal trace physically connects the first chip 102 to the second chip 104. Signals may be transmitted via this metal traces.

As shown in FIG. 1, the second chip 104 includes a clock divider 126 which is disposed outside of the receiver 108. In at least some embodiments, the position of the de-skew circuit such as de-skew circuit 128 may be considered a physical boundary of the receiver 108. The clock divider 126 is configured to receive the clock signal sent via the clock signal lane 124 and to create and send a first divided clock signal and a second divided clock signal from the received clock signal. The first divided clock signal and the second divided clock signal may each have reduced rates as compared to the first rate at which the original clock signal was generated. In the depicted embodiment, the first divided clock signal may be an in-phase signal. The second divided clock signal may be a quadrature clock signal. In the depicted embodiment, these two divided clock signals run at half the rate of the original clock signal, i.e., at one quarter of the data rate. The in-phase signal may maintain the same phase that the original clock signal has. The quadrature clock signal may have a shifted phase as compared to the phase of the original clock signal. This shifting is the basis for the use of the name "quadrature" for this divided clock signal. This shifting may be by an amount of ninety degrees in at least some embodiments.

The clock divider 126 may generate these reduced-frequency clock signals while maintaining current mode logic (CML) properties of the clock signal. CML circuits have a lower output voltage swing compared to the static CMOS circuits, and are well known to those skilled in the art. CML circuits have improved performance due to a lower voltage swing and due to the differential nature of the signals. Being differential helps the clock signals be more tolerant of power supply noise and more resilient against the possibility of collapse. The clock divider 126 receives the clock signal from the clock lane 124 without any intervening signal buffering and without any intervening voltage swing level adjustment of the clock signal. For example, in at least one embodiment the clock signal is received by the clock divider 126 without the clock signal being buffered to a CMOS swing level. Higher bandwidths may be reached by maintaining the CML properties and not buffering to CMOS levels.

Figure 2:
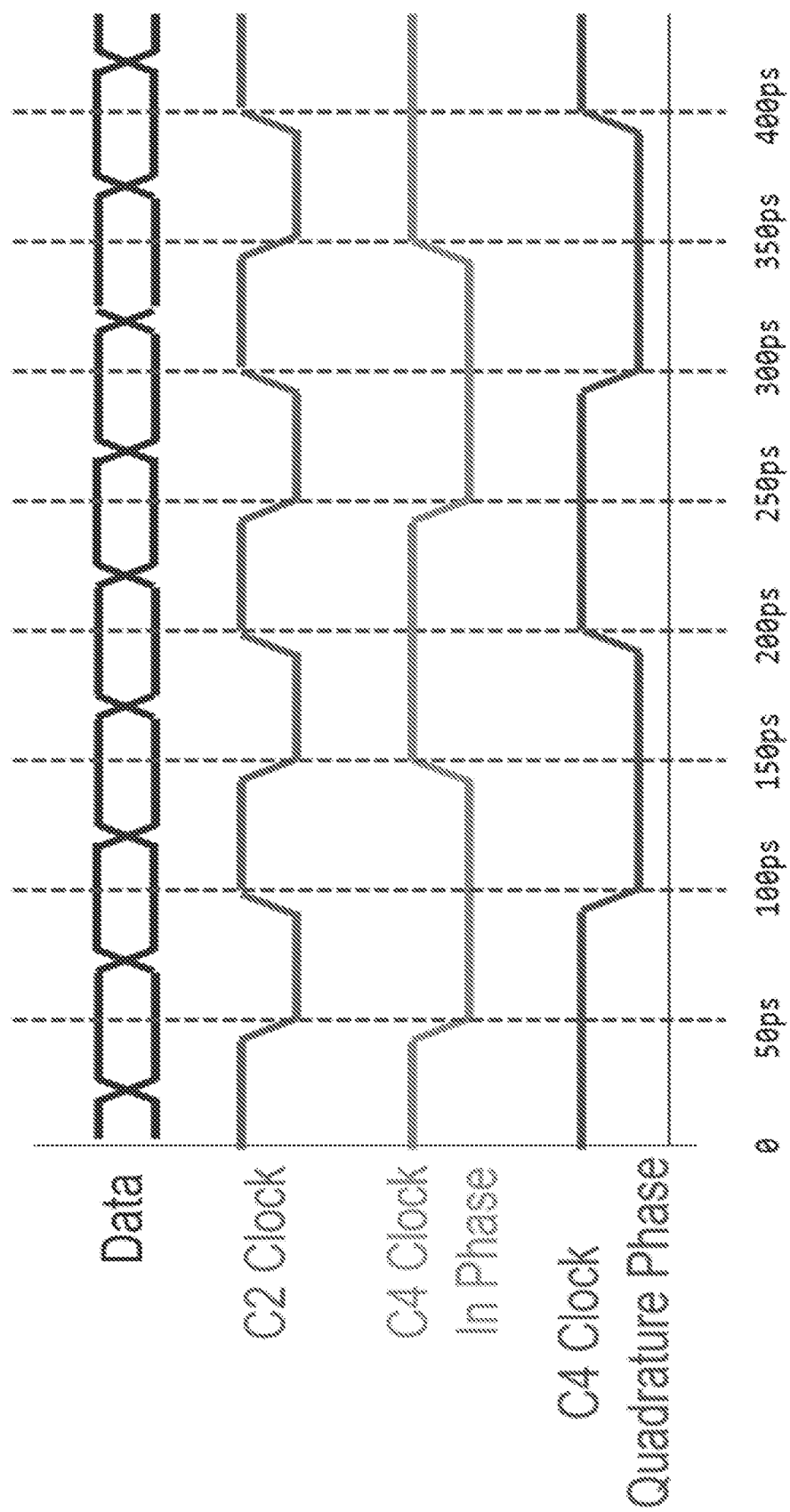
FIG. 2 shows a graph comparison of signal frequencies for various signals implemented with the clock signal split features according to at least one embodiment.

FIG. 2 shows a graph comparison of signal frequencies for various signals implemented with the clock signal split features according to at least one embodiment. The data signal that is transmitted via the data lane 116 is shown as a differential signaling pair oscillating at a first rate or frequency. A fundamental frequency refers to the time between two immediately subsequent corresponding edges in the signal, e.g., between the two closest-to-each-other rising edges in the signal or the two closest-to-each-other falling edges in the signal. The C2 clock signal refers to the original clock signal that is generated via the clock generator 120 and transmitted via the clock signal lane 124. The graph of FIG. 2 shows that the clock signal oscillation frequency is one half of the data rate. If the data signal is running at 20 Gigabits per second (50 ps per bit) across the data lane 116, the clock signal would be oscillating at 10 Gigahertz (100 ps cycle) across the clock signal lane 124. The C4 clock in-phase and the C4 clock quadrature phase lines shown in FIG. 2 are examples of first and second divided clock signals that are produced via the clock divider 126 that receives the clock signal from the clock signal lane 124 and which oscillate at a reduced rate compared to the clock signal. FIG. 2 shows that these two signals are oscillating at half of the rate of the C2 clock signal, i.e., at a quarter of the rate of the data signal. FIG. 2 shows that the in-phase clock signal maintains the phase of the C2 clock signal, but that the quadrature clock signal is shifted by ninety degrees to be out-of-phase with respect to the C2 clock signal.

By distributing these lower frequency clock signals, power requirements for these clock signals are reduced throughout the chips. Circuits that are distributing these clock signals may be powered down due to the reduced frequency. Nevertheless, the de-skew circuit 128 is still successful to correct the phases of the reduced-frequency clock signals so that the data from the data lane 116 may be correctly sampled.

The clock divider 126 may additionally include CML (current mode logic) circuits for correcting jitter in the received clock signal. Such jitter may be a timing variation of a set of signal edges from an ideal value and may be caused by noise or other disturbances in the second chip 104 or in the chip package 100.

The divided clock signals are transmitted to the receiver 108 and particularly to a de-skew circuit 128 of the receiver 108. The de-skew circuit 128 corrects the phase of the divided clock signals so that the data received via the data lane 116 can be sampled. The de-skew circuit 128 mixes the two divided clock signals to generate a final clock signal which may have an arbitrary phase with an edge that is different from the phases of the individual divided clock signals. The sampling may be based on the phase of the mixed signal. In at least one embodiment, the de-skew circuit 128 includes a first phase rotator to generate a first sampling clock signal. The de-skew circuit 128 may also include a second phase rotator to generate a second quadrature sampling clock signal that is shifted ninety degrees from the first sampling clock signal. In other embodiments, the de-skew circuit 128 may include delay lines or delay-locked loops instead of phase rotators in order to correct the phases of the divided clock signals. The de-skew circuit 128 synchronizes the divided clock signals with the data.

Figure 3:
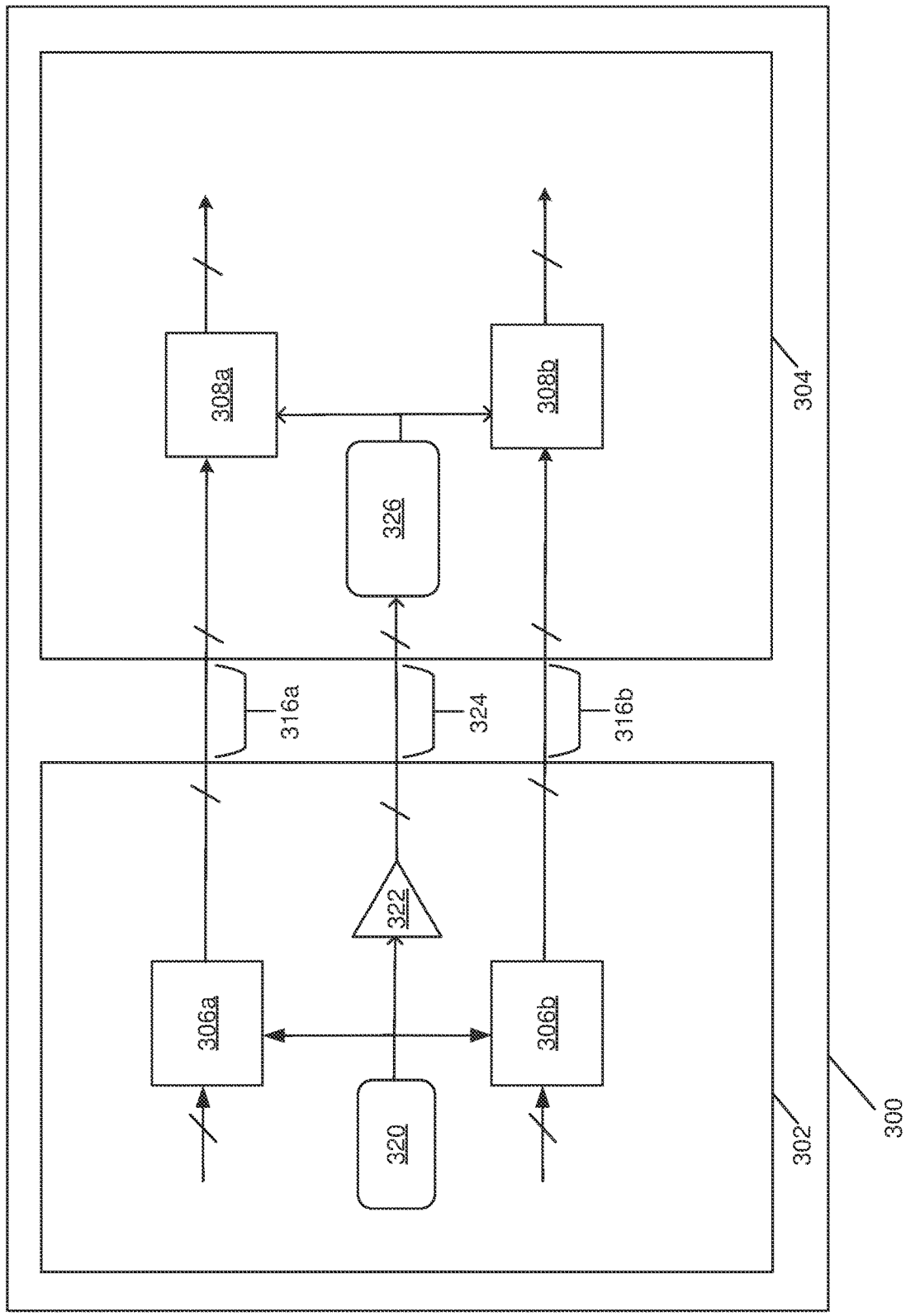
FIG. 3 is another block diagram illustrating another chip package with the clock signal split features in accordance with at least one embodiment.

FIG. 3 is another block diagram illustrating another chip package 300 with the clock signal split features in according to at least one embodiment. The other chip package 300 includes mostly similar clock forwarding and clock signal splitting and frequency reduction concepts as occurred for the chip package 100 shown in FIG. 1. FIG. 3 illustrates the concept that another clock divider 326 on the other second chip 304 may create divided clock signals that service multiple receivers on the other second chip. Specifically, in the example shown in FIG. 3 the other clock divider 326 receives a clock signal via the other clock signal lane 324, generates first and second reduced-frequency divided clock signals, e.g., an in-phase clock signal and a quadrature clock signal based on the received clock signal, and then transmits the two reduced-frequency divided clock signals to the first receiver 308*a* and to the second receiver 308*b* which are both on the other second chip 304. Although FIG. 3 shows that the other clock divider 326 services two receivers, in other embodiments the clock divider may generate the reduced-frequency split signals to service more than two receivers. In this embodiment, the other clock divider 326 may generate the reduced-frequency clock signals as CMOS or CML clock signals.

Thus, FIG. 3 illustrates a structural aspect for the interconnect architecture to achieve additional power and space-saving requirements that each of the receivers does not require its own clock divider lane. FIG. 3 also includes certain advantages of the architecture depicted in FIG. 1 that with the distribution of the lower frequency clock signals on the receiving chip, power requirements for the receiving chip may be reduced.

For this interconnect architecture depicted FIG. 3, each of the first and second receivers 308a and 308b, respectively, includes its own de-skew circuit equivalent to the de-skew circuit 128 of FIG. 1. The first and the second receiver 308a, 308b may receive data signals via first and second data lanes 316a, 316b, respectively. The data signals may be transmitted via first and second transmitters 306a, 306b, respectively, on another first chip 302. Another clock generator 320 may generate the first half-rate clock signal for the other clock signal lane 324. The other clock generator 320 may pass the clock signal to another driver 322 which drives the clock rate signal across the other clock signal lane 324.

For simplicity, internal components of the first and second transmitters 306a, 306b and the first and second receivers 308a, 308b are not shown in FIG. 3 but may be equivalent to the internal components of the corresponding transmitter 106 and receiver 108, respectively, shown in FIG. 1 and described above.

FIG. 3 shows with the symbols "/" in the connections/lines that differential signaling is being implemented. For differential signaling, two complementary voltage signals may be generated and transmitted. Upon their receipt, the signals may be combined in order to produce one information signal. In other embodiments in which the clock divider on a receiving chip serves multiple receivers on the receiver chip, the lanes with the enhanced interconnect may implement other signaling types instead of differential signaling. For example, in other embodiments single-ended signaling may be performed with each of the lanes of the interconnect.

Figure 4:
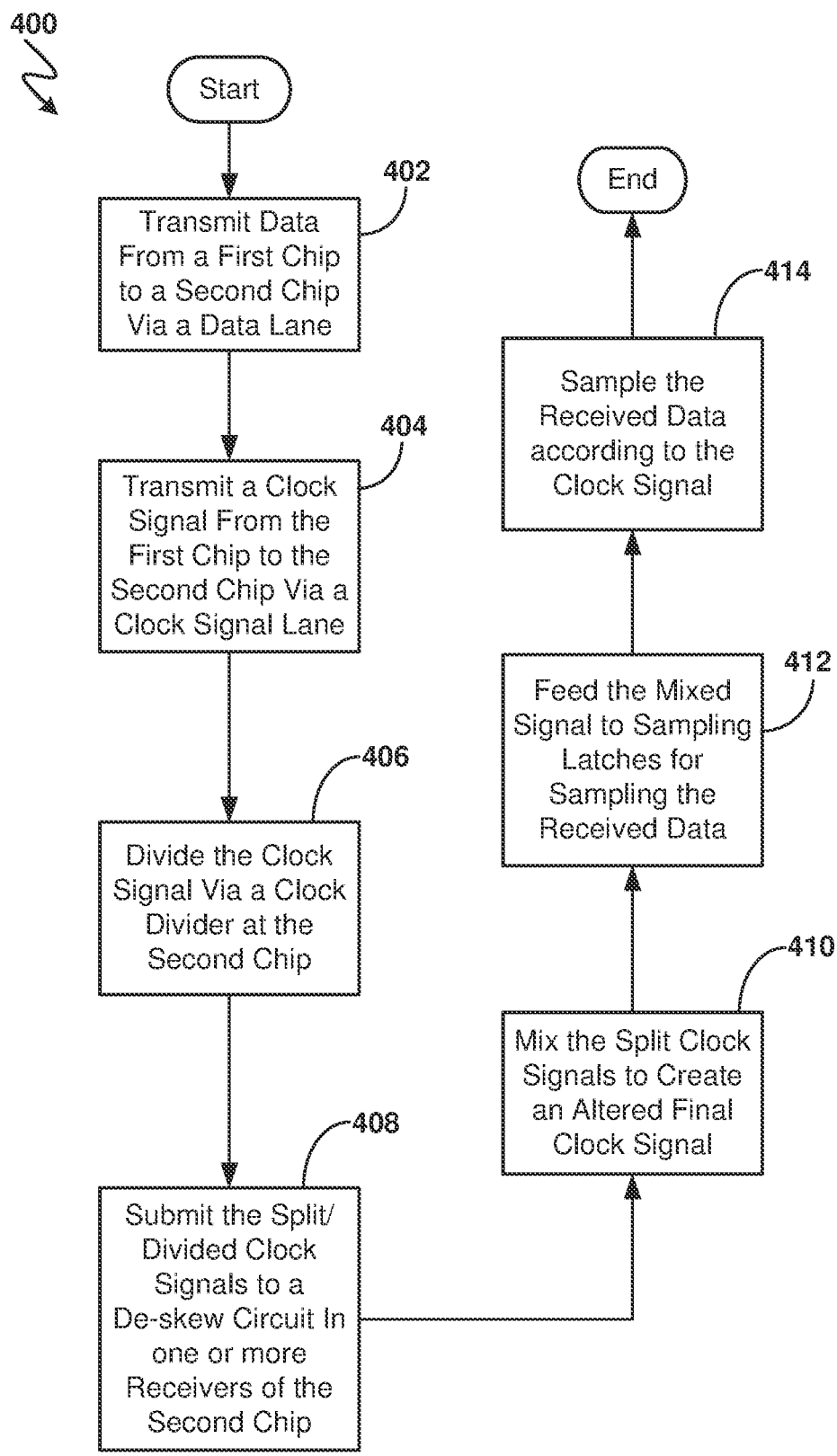
FIG. 4 is an operational flowchart illustrating a clock signal split process according to at least one embodiment.

FIG. 4 is an operational flowchart illustrating a clock signal split process 400 according to the at least one embodiment and that may be performed using the improved interconnect architecture depicted in FIGS. 1 and/or 3.

In step 402 of the clock signal split process 400, data is transmitted from a first chip to a second chip via a data lane. FIG. 1 showed the example of data being transmitted from the transmitter 106 of the first chip 102 to the receiver 108 of the second chip 104 via the data lane 116. FIG. 3 showed the examples of data being transmitted from the other first chip 302 to the other second chip 304 via multiple data lanes, namely via the first other data lane 316a and the second other data lane 316b. The first chip and the second chip may both physically be part of a single chip package.

In step 404 of the clock signal split process 400, a clock signal is transmitted from the first chip to the second chip via a clock signal lane. The clock signal lane may be physically separate from the data lane or lanes involved in step 402. FIG. 1 shows an example of a clock generator 120 generating a clock signal that is transmitted via the clock signal lane 116 from the first chip 102 to the second chip 104. FIG. 3 shows an example of another clock signal lane 316 used for transmitting a clock signal from the other first chip 302 to the other second chip 304.

In step 406 of the clock signal split process 400, the clock signal is divided via a clock divider at the second chip. This clock signal refers to the clock signal that was transmitted in step 404. FIG. 1 shows an example of a clock divider 126 which divides and splits the clock signal into a first divided clock signal and a second divided clock signal. FIG. 3 shows an example of another clock divider 326 which divides and splits the clock signal into a first divided clock signal and a second divided clock signal. The divided clock signals may have a reduced frequency compared to the frequency of the original clock signal. The divided clock signals may include an in-phase clock signal and a quadrature clock signal which each run at half of the frequency of the original clock signal. The quadrature clock signal may have a phase which is shifted ninety degrees compared to the original clock signal. The clock divider may be disposed outside of any receiver on the second chip.

In step 408 of the clock signal split process 400, the split/divided clock signals are submitted to a de-skew circuit in one or more receivers of the second chip. The split/divided clock signals refer to those signals that were produced in step 406. FIG. 1 shows an example of divided clock signals from the clock divider 126 being input to a de-skew circuit 128 within the receiver 108 of the second chip. In the embodiment shown in FIG. 3, divided signals from the other clock divider 326 are input to a de-skew circuit within the first other receiver 308a and to another de-skew circuit within the second other receiver 308b. The de-skew circuits may include one or more phase rotators, delay lines, and/or delay-locked loops for correcting the phase of the divided signals.

In step 410 of the clock signal split process 400, the split clock signals are mixed to create altered final clock signals. The de-skew circuit involved in step 408 may create these altered final clock signals from the divided clock signals. The altered final clock signals may have an arbitrary phase with an edge that is different from the phases of the individual divided clock signals. For example, if a zero degree phase and a ninety degree phase were received for the split clock signals, the altered final clock signal may have a phase of forty-five degrees or of any combination of the divided clock signals. The de-skew circuit may send an individual clock signal to each sampling latch, e.g., may send a total of four individual clock signals for a total of four sampling latches.

In step 412 of the clock signal split process 400, the mixed signals are fed to sampling latches for sampling the received data. The mixed signals refer to the altered final clock signals that were created in step 410. FIG. 1 shows an exemplary embodiment with four sampling latches, namely the first sampling latch 6a, the second sampling latch 6b, the third sampling latch 6c, and the fourth sampling latch 6d, that are involved in step 412. FIG. 3 shows a first other receiver 308a and a second other receiver 308b. Each of these other receivers 308a, 308b include sampling latches which receive a mixed signal from a de-skew circuit within these other receivers 308a, 308b, respectively.

In step 414 of the clock signal split process 400, the received data is sampled according to the clock signal. The received data refers to that data that was transmitted in step 402. The data is received by the same receiver which holds the de-skew circuit involved in steps 408 and 410 and which holds the sampling latches involved in step 412. FIG. 1 shows that data is sampled at the multiple sampling latches and then is fed to the de-serializer 130. In the embodiment shown in FIG. 3, data from the first other data lane 316a and the second other data lane 316b may as part of the step 414 be sampled according to the clock signal.

It may be appreciated that FIGS. 1-4 provide only illustrations of some embodiments and do not imply any limitations with regard to how different embodiments may be implemented. Many modifications to the depicted embodiment(s), e.g., to a depicted structure, process flow, and/or sequence of steps, may be made based on design and implementation requirements.

Figure 5:
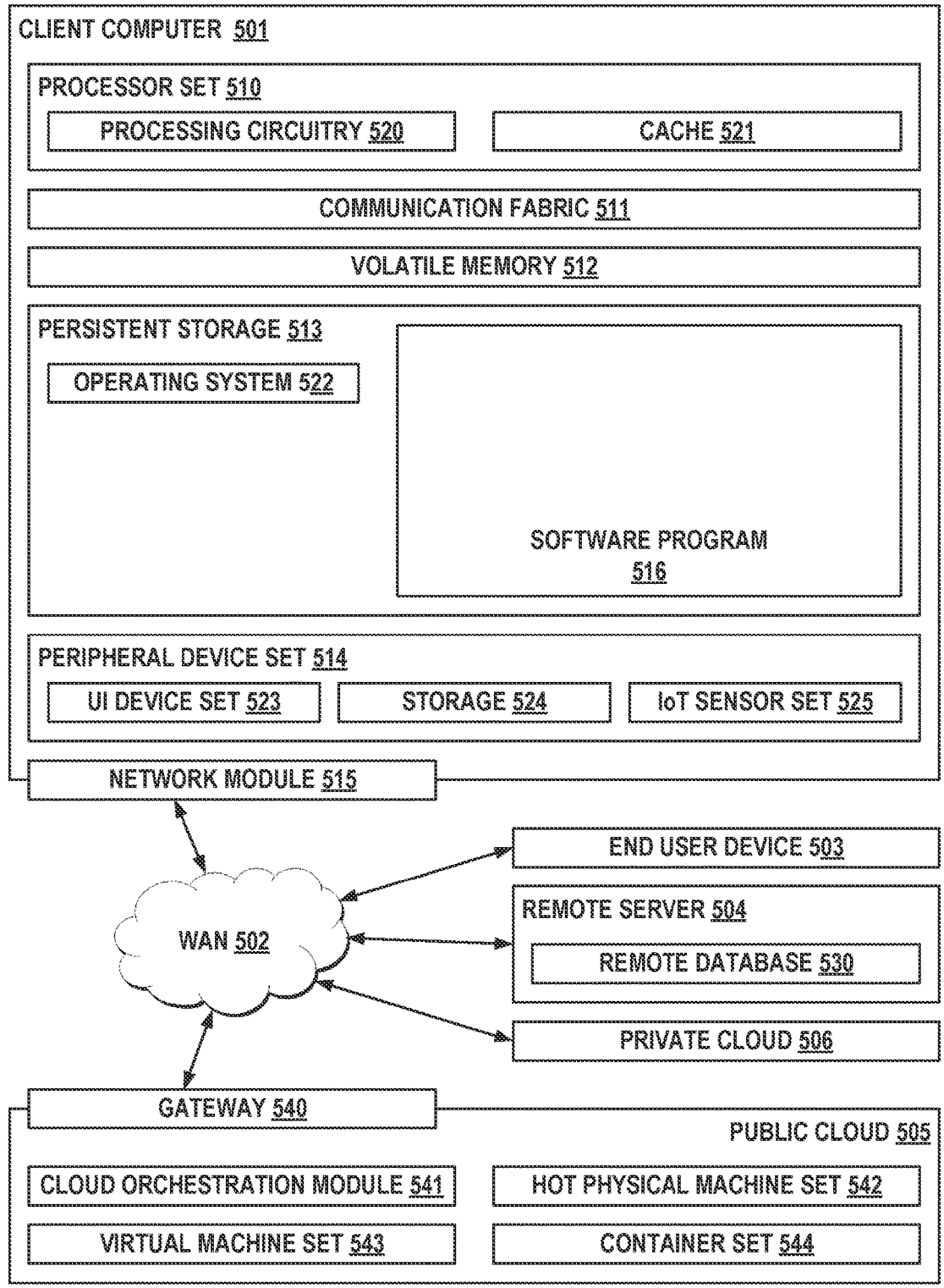
FIG. 5 is a block diagram of internal and external components of a computer system in which one or more of the chip packages described herein may be implemented.

FIG. 5 is a block diagram of internal and external components of a computer system in which one or more of the chip packages described herein may be implemented. Computing environment 500 shows an example of one or more computers with processors in which the enhanced circuitry interconnect architecture described above may be implemented. Computing environment 500 includes, for example, computer 501, wide area network. (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and software program 516, peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544. The processing circuitry 520 of the computer 501 and processing circuitry of the remote server 504 may each include the enhanced interconnect architecture as described above.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 1. On the other hand, computer 501 is not required to be in a cloud.

PROCESSOR SET 51.0 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501. These computer readable program instructions are stored in various types of computer readable storage media, such as cache 521 and the other storage media discussed below. The program instructions, and associated data, are accessed by processor set 510 to control and direct performance of the inventive methods.

COMMUNICATION FABRIC 511 is the signal conduction path that allows some components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 101 and/or directly to persistent storage 513. Persistent storage 513 may be a read only memory (ROM), but typically at least a portion of the persistent storage allows writing of data, deletion of data and re writing of data. Some familiar forms of persistent storage include magnetic disks and solid state storage devices. Operating system 522 may take several forms, such as various known proprietary operating systems or open source Portable Operating System Interface-type operating systems that employ a kernel.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector. The various sensors and/or UI devices may separately each include a package with the enhanced interconnect architecture as described herein.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501) and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on. Each EUD 503 may respectively include a package with the enhanced interconnect architecture as described herein.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504. The remote server 504 may include a package with the enhanced interconnect architecture as described herein.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. Each of these physical computers may include a respective package with the enhanced interconnect architecture as described herein.

The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

In computing environment 500, computer 501 is shown as being connected to the internet (see WAN 502). However, in many embodiments the computer 501 will be isolated from communicating over communications network and not connected to the internet, running as a standalone computer. In these embodiments, network module 515 of computer 501 may not be necessary or even desirable in order to ensure isolation and to prevent external communications coming into computer 501. The standalone computer embodiments are potentially advantageous, at least in some applications of the present invention, because they are typically more secure. In other embodiments, computer 501 is connected to a secure WAN or a secure LAN instead of WAN 502 and/or the internet. In these network connected (that is, not standalone) embodiments, the system designer may want to take appropriate security measures, now known or developed in the future, to reduce the risk that incoming network communications do not cause a security breach.

The flowchart and block diagrams in the Figures illustrate the architecture, functionality, and operation of possible implementations of systems and methods according to various embodiments of the present invention. In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An integrated circuit communication architecture comprising:
   a clock lane configured to send a clock signal at a first rate from a first chip to a second chip;
   a clock divider on the second chip, the clock divider configured to receive the clock signal sent via the clock lane and to create and send a first divided clock signal and a second divided clock signal from the received clock signal, the first divided clock signal and the second divided clock signal being sent at reduced rates compared to the first rate, the clock divider maintaining current mode logic properties for the first and second divided clock signals; and
   multiple receivers on the second chip, each of the multiple receivers comprising its own de-skew circuit configured to receive and process the first divided clock signal and the second divided clock signal from the clock divider to allow for sampling of data transmitted from the first chip to the second chip.

2. The integrated circuit communication architecture of claim 1, wherein the first rate is a half rate compared to a data rate.

3. The integrated circuit communication architecture of claim 1, wherein the first divided clock signal is an in-phase clock signal and runs at one quarter of a data rate.

4. The integrated circuit communication architecture of claim 1, wherein the second divided clock signal is a quadrature clock signal and runs at one quarter of a data rate.

5. The integrated circuit communication architecture of claim 1, wherein the clock divider comprises one or more current mode logic circuits for low clock jitter.

6. The integrated circuit communication architecture of claim 1, wherein a first de-skew circuit comprises one or more phase rotators for rotating the first divided clock signal and the second divided clock signal.

7. The integrated circuit communication architecture of claim 1, wherein the reduced rate of the first divided clock signal is half of the first rate.

8. The integrated circuit communication architecture of claim 1, wherein the reduced rate of the second divided clock signal is half of the first rate.

9. The integrated circuit communication architecture of claim 1, further comprising a driver on the first chip for driving the clock signal across the clock lane.

10. The integrated circuit communication architecture of claim 1, further comprising a data lane configured to transmit data from the first chip to the second chip.

11. The integrated circuit communication architecture of claim 1, wherein a first de-skew circuit is disposed in a first receiver of the multiple receivers of the second chip, and the clock divider serves the multiple receivers on the second chip.

12. A method of integrated circuit communication, the method comprising:
   transmitting a clock signal via a clock lane and at a first rate from a first chip to a second chip;
   dividing the transmitted clock signal via a clock divider at the second chip to form a first divided clock signal and a second divided clock signal having reduced rates compared to the first rate;
   maintaining, via the clock divider, current mode logic properties for the first and second divided clock signals; and
   inputting the first divided clock signal and the second divided clock signal into multiple receivers of the first chip, wherein each of the multiple receivers comprises its own de-skew circuit and the inputting into the multiple receivers occurs into the de-skew circuits.

13. The method of claim 12, wherein the first rate is a half rate.

14. The method of claim 12, wherein the first divided clock signal is an in-phase clock signal and runs at one quarter of a data rate.

15. The method of claim 12, wherein the second divided clock signal is a quadrature clock signal and runs at one quarter of a data rate.

16. The method of claim 12, wherein the clock divider comprises one or more current mode logic circuits for low clock jitter.

17. The method of claim 12, wherein a first de-skew circuit comprises one or more phase rotators for rotating the first divided clock signal and the second divided clock signal.

18. An integrated circuit communication architecture comprising:
- a clock lane configured to send a clock signal at a first rate from a first chip to a second chip;
- a clock divider on the second chip, the clock divider configured to receive the clock signal sent via the clock lane and to create and send a first divided clock signal and a second divided clock signal from the received clock signal, the first divided clock signal and the second divided clock signal being sent at reduced rates compared to the first rate; and
- first and second receivers on the second chip, the first receiver including a first de-skew circuit, the second receiver including a second de-skew circuit, wherein the first and second de-skew circuits are configured to receive and process the first divided clock signal and the second divided clock signal from the clock divider to allow for sampling of data transmitted from the first chip to the second chip;
- wherein the clock divider is configured to serve both the first receiver and the second receiver with each of the first divided clock signal and the second divided clock signal.

19. The integrated circuit communication architecture of claim 18, wherein the first divided clock signal is an in-phase clock signal and runs at one quarter of a data rate.

20. The integrated circuit communication architecture of claim 18, wherein the second divided clock signal is a quadrature clock signal and runs at one quarter of a data rate.

* * * * *